United States Patent [19]

Werner

[11] 4,233,963
[45] Nov. 18, 1980

[54] SOLAR HEAT COLLECTOR SYSTEM HAVING MEANS TO ACCOMMODATE THERMAL EXPANSION

[75] Inventor: Frank D. Werner, Jackson, Wyo.

[73] Assignee: Park Energy Company, Jackson, Wyo.

[21] Appl. No.: 944,638

[22] Filed: Sep. 21, 1978

[51] Int. Cl.³ .............................................. F24J 3/02
[52] U.S. Cl. .................................... 126/450; 126/428; 52/83; 52/573
[58] Field of Search .................... 52/573, 86, 222; 126/270, 271, 428, 429, 450, 432, 449; 237/1 A

[56] References Cited

U.S. PATENT DOCUMENTS

| Re. 25,733 | 2/1965 | Pary et al. ........................ 189/36 |
| 2,133,088 | 10/1938 | Faber ................................ 52/573 X |
| 2,580,555 | 1/1952 | Kroeger ........................ 126/271 X |
| 2,796,624 | 6/1957 | Speer ............................ 52/573 X |
| 3,072,920 | 1/1963 | Yellott ................................ 4/172 |
| 3,269,069 | 8/1966 | Carlson ........................ 52/573 X |
| 3,277,884 | 10/1966 | Rowekamp ........................ 126/432 |
| 3,323,269 | 6/1967 | Widdowson ........................ 52/483 |
| 3,434,254 | 3/1969 | Rubin ................................ 52/108 |
| 3,550,335 | 12/1970 | Huffman ........................ 52/573 X |
| 3,835,603 | 9/1974 | Schnebel ........................ 52/83 |
| 3,863,621 | 2/1975 | Schoenfelder ........................ 126/270 |
| 3,875,925 | 4/1975 | Johnston ........................ 126/429 |
| 3,908,631 | 10/1975 | Rom ................................ 126/270 |
| 3,919,784 | 11/1975 | Tonn ........................ 126/270 X |
| 3,939,818 | 2/1976 | Hamilton et al. ........................ 126/432 |
| 3,955,555 | 5/1976 | Bostrom ........................ 126/270 |
| 4,027,437 | 6/1977 | Monsky et al. ........................ 126/270 X |
| 4,049,195 | 9/1977 | Rugenstein ........................ 237/1 A |
| 4,064,663 | 12/1977 | Moss ........................ 52/86 X |
| 4,069,593 | 1/1978 | Huang ........................ 237/1 A X |
| 4,073,282 | 2/1978 | Schriffer, Jr. ........................ 126/271 X |
| 4,076,013 | 2/1978 | Bette ........................ 237/1 A X |
| 4,086,908 | 5/1978 | Werner et al. ........................ 126/270 |
| 4,116,220 | 9/1978 | Burd ........................ 126/270 X |
| 4,126,270 | 11/1978 | Hummel ........................ 126/428 |

Primary Examiner—Samuel Scott
Assistant Examiner—Randall L. Green
Attorney, Agent, or Firm—Kinney, Lange, Braddock, Westman and Fairbairn

[57] ABSTRACT

A large scale solar heat collector system which utilizes a building design to permit substantial areas of perforated heat collector sheets to be mounted and through which sheets air is passed to transfer the heat from the collector sheets to the air. The collector sheets are supported and mounted in a manner so that they can expand and contract under thermal variations even when exceedingly large areas are used to thereby permit mounting collector sheets that have a substantial area in a low cost, economical wy to permit large amounts of heat to be collected and stored in a single installation.

5 Claims, 9 Drawing Figures

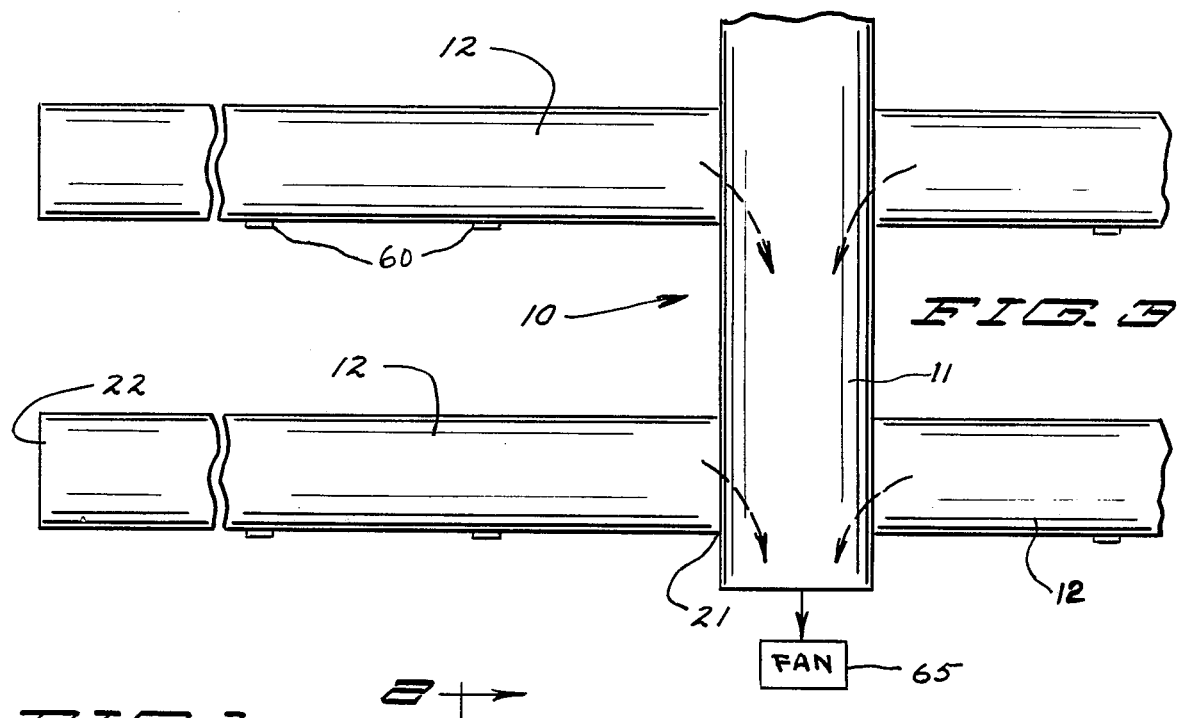
FIG. 3
FIG. 1
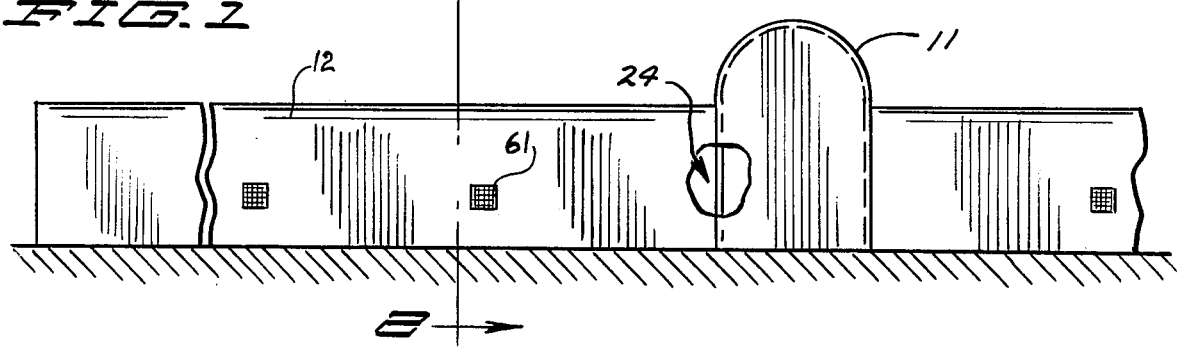
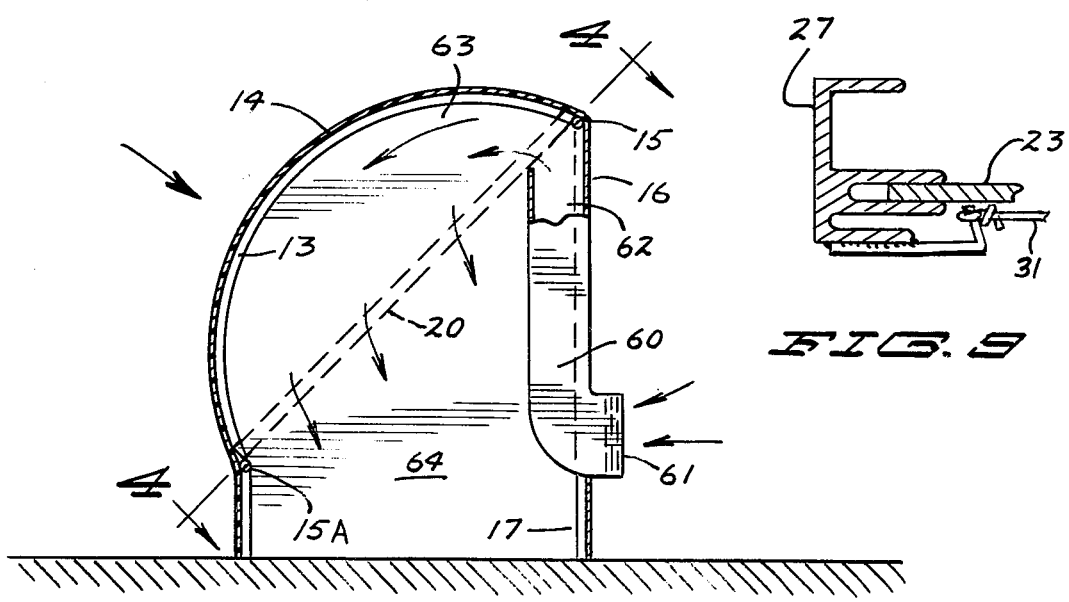
FIG. 9
FIG. 2

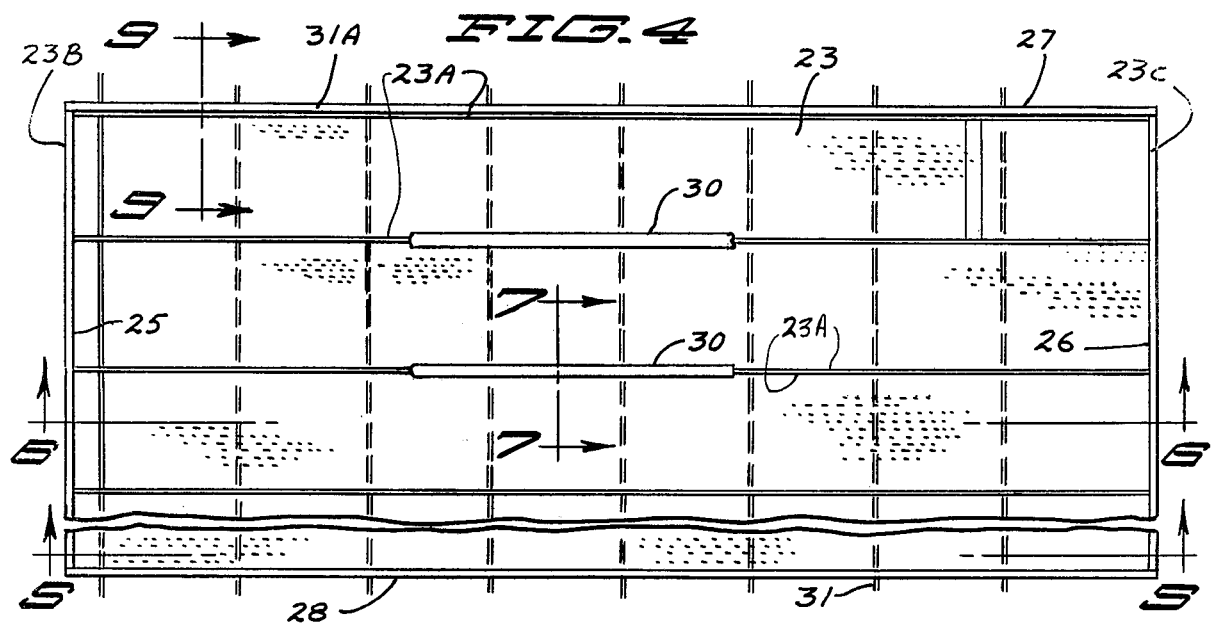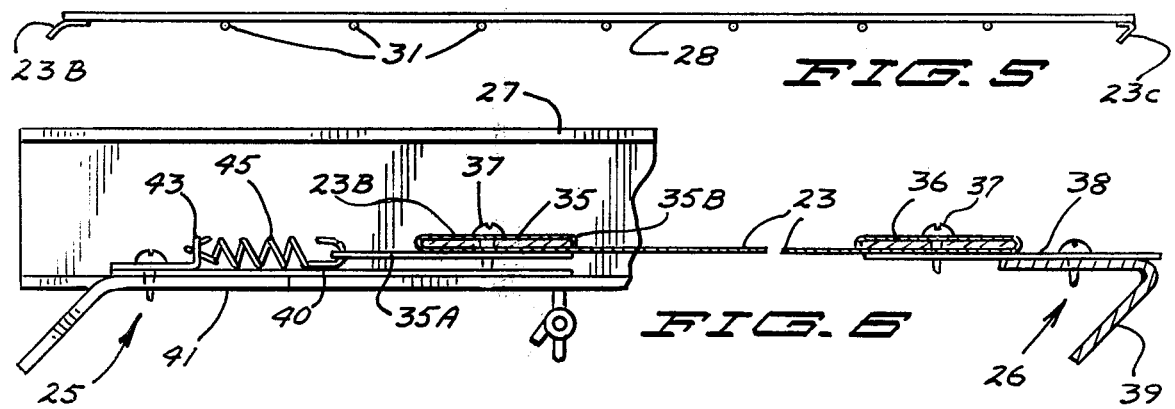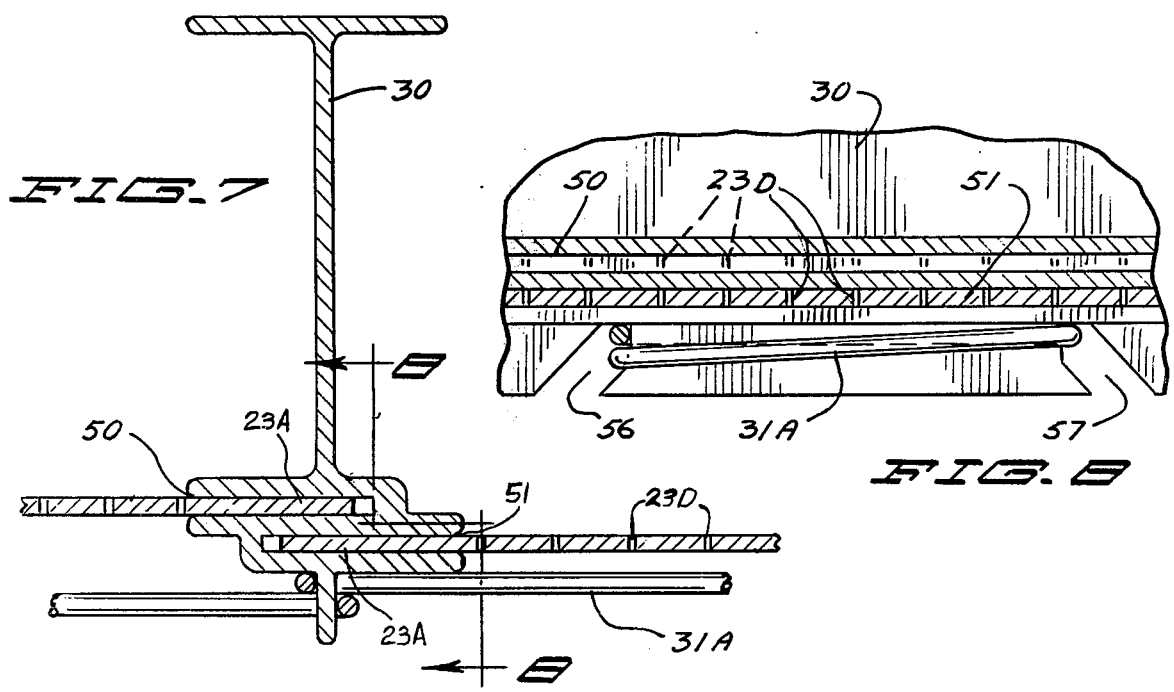

SOLAR HEAT COLLECTOR SYSTEM HAVING MEANS TO ACCOMMODATE THERMAL EXPANSION

BACKGROUND OF THE INVENTION

1. Field of the Invention

The present invention relates to solar heat collector systems and more particularly to a system which will permit the usage of large areas of continuous perforated sheets for such collection.

2. Prior Art

In the prior art the use of perforated solar collector sheets is well known, but generally these are fixed in small frames attached around their edges. An example of such solar collector sheets is shown in my U.S. Pat. No. 4,086,908, and also in Schoenfelder U.S. Pat. No. 3,863,621.

Other patents illustrate the general concept of attempting to provide for thermal expansion of panels of various kinds. U.S. Pat. No. 3,323,269 shows such a general conception of accommodating expansion in large panels. U.S. Pat. No. Re. 25,733 also deals with the expansion problem but shows an elastomeric center section to provide for such expansion. The supporting of a roof structure from a stretched cable net or the like is shown in U.S. Pat. No. 3,835,603, and relatively large building constructions for drying apparatus with tunnels for collecting solar heat energy are shown in U.S. Pat. Nos. 3,908,631 and 3,919,784. U.S. Pat. No. 4,027,437 shows an inflatable building supported over a framework, and U.S. Pat. No. 3,434,254 utilizes perforated sheets for a boom that is used in a space vehicle. The tube is flattened out for storage and then it springs open for structural strength and use at a later time. Additional patents that show various structures related to solar heat collection include a swimming pool cover patent shown in U.S. Pat. No. 3,072,920 and another device of general interest is shown in U.S. Pat. No. 2,580,555.

SUMMARY OF THE INVENTION

The present invention relates to a harge scale solar heat collector utilizing a principle that permits substantial areas of continuous length sheets that are perforated for permitting fluid flow through the perforations for solar heat collection. The sheets are mounted side by side and supported at their longitudinal edges in a manner which accommodates expansion and contraction under high temperature differentials. The panels are mounted in a building assembly or construction utilizing a central tunnel or main duct through which the main flow occurs and laterally extending ducts. The lateral ducts or portions of the building are used for mounting the solar heat collectors and fluid is taken into the ducts, passed across the collector sheets and into the central tunnel to the heat storage or utilization area.

The sheets of perforated material used for the solar heat collectors are made in relatively narrow, but greatly elongated strips. One end of each collector sheet is fastened to a frame, and the opposite end of each collector sheet is spring loaded so that the sheets can expand and contract against the spring load. The longitudinal edges are supported in channels which permit the edges to slide as the sheets expand and contract. Additionally, guy wires are extended across the width of all the sheets in each assembly for support and also to permit them to slide to accommodate expansion.

The sheets as shown are made in accordance with the teachings of U.S. Pat. No. 4,086,908 and the lateral ducts are provided with passages to permit air to flow into the ducts and through the opening in the sheets, and then toward a central tunnel duct which provides the main conduit for transfer of heated air to the location to be heated from the solar heat collector assembly.

The length of the lateral extending ducts can be as desired, and generally may be several hundred feet long. Additional laterally extending ducts can be formed as desired. The solar heat collector panels are positioned so that the surfaces of the panels are inclined generally about 45° with respect to the earth surface and have radiant energy absorbing surface facing upwardly. The lateral ducts may be made of a framework covered with radiant energy transparent plastic much like the plastic greenhouses that are in use at the present time. The vertical walls and tunnel duct may be made of fiberglass or other materials.

It is well known to construct greenhouses with metal frames, such as pipes, channels or other structural members spaced regularly along the longitudinal axis of the greenhouse with raidant energy transparent plastic sheets clipped to such framework to form greenhouses. The details of construction of the ducts and supports used for the solar heat collector system are not shown in the present application.

BRIEF DESCRIPTION OF THE DRAWINGS

FIG. 1 is an end elevational view of typical solar heat collecting installation made according to the present invention;

FIG. 2 is a sectional view of a lateral duct taken as on line 2—2 in FIG. 1 illustrating the construction schematically;

FIG. 3 is a fragmentary top plan view of the solar heat collector system of FIG. 1;

FIG. 4 is a part schematic top plan view of a solar heat collector sheet assembly which is mounted in each of the lateral ducts as shown in FIG. 2, and which view is taken generally along the line 4—4 in FIG. 2 with parts broken away;

FIG. 5 is a sectional view taken as on line 5—5 in FIG. 4;

FIG. 6 is a fragmentary enlarged view with parts broken away to show the mounting of the end portions of the solar collector sheets utilized with the collector system of the present invention;

FIG. 7 is an enlarged view of a typical supporting channel used between adjacent strips of the solar heat collecting sheets;

FIG. 8 is a sectional view taken as on ine 8—8 in FIG. 7; and

FIG. 9 is a sectional view taken as on line 9—9 in FIG. 4.

DESCRIPTION OF THE PREFERRED EMBODIMENT

Referring to FIGS. 1, 2 and 3, a schematic showing of the overall solar heat collector system is illustrated generally at 10. The system comprises greenhouse type buildings made in the usual manner, and which are shown only schematically. These can be formed of a generally tunnel shape large central or main duct structure 11 which can be made in any desired manner, and can be made of any type of material. Generally the main duct would have insulated walls, and the construction is shown only schemtically. The structure includes a framework with an outer covering much like a quonset type building or any of the curtain wall construction generally known as "pole type" buildings.

The main duct tunnel has openings in its side wall leading to a plurality of laterally extending collector housings or ducts indicated generally at 12. These collector ducts 12 are of a "greenhouse" type construction as well, and include an internal framework 13, which would in turn support a radiant energy transparent sheet such as a suitable plastic sheet 14. Greenhouse type constructions are adequate for solar heat collecting ducts or housings, and the frames 13 are supported in suitable footings. The overhead frames are fastened together with longitudinally extending stringers at locations such as those indicated generally at 15 and 15A in FIG. 2. The construction generally can be similar to that shown in U.S. Pat. No. 3,488,899.

A vertical support wall on each lateral duct, indicated generally at 16 can be made of usual construction materials and need not be radiant energy transparent. Normally this would be a curtain wall supported on upright frame members 17 that are mounted in the ground, and attached to the upper longitudinal stringer 15. Additional longitudinal stringers can be placed at desired intervals to provide adequate support for the cover sheet of material 14 around the curved portion of the lateral duct that is shown in FIG. 2. The frame members are joined together with suitable clips or other fastening devices to form a rigid frame over which the solar energy transparent cover sheet of material 14 would be placed. Also note that a vertical support frame member 15B extends down from frame member 13 to support a longitudinal stringer 15C which is used as a support for one edge of solar heat collector assembly.

The solar heat collector sheets and frames are indicated in dotted lines in FIG. 2 at 20. Reference is made to my U.S. Pat. No. 4,086,908 for the details of the construction of a usable radiant energy or solar heat absorbing panel or strip type sheet. The panels are aluminum strips which are perforated and which are made in widths generally in the range of two or so feet wide. The sheets are made in a continuous length that extends the slant length of each of the assemblies in the laterally extending ducts 12.

A continuous sheet of thin aluminum sheeting as disclosed in U.S. Pat. No. 4,086,908 would be provided from adjacent the lower edge collector adjacent stringer 15A to the upper edge adjacent stringer 15. The lateral ducts have inner ends shown at 21 ind outer ends 22. The collector assemblies extend from the inner to the outer end of each lateral duct.

In FIG. 4 a top view of such an assembly is shown partially schematically. Each of the individual sheets or strips 23 of perforated aluminum is suitably faced with radiant energy absorbing paint or other material. This face is directed upwardly. As shown in FIG. 4, there are as many of the sheets or panels 23 placed side by side as necessary to complete each collector frame. Each sheet has longitudinal edges 23A and a lower end edge 23B and an upper end edge 23C. One side or end of the collector is adjacent an opening leading from the lateral duct into the main duct or tunnel 11 and such opening is shown schematically in FIG. 1 at 24.

The individual sheets 23 for each collector assembly are supported on frame members which in turn are supported with respect to the upper and lower longitudinal stringers 15 and 15A. The framework may be supported at its ends in other suitable ways. Such frame members are made to be of adequate strength to support the lightweight aluminum sheets 23. The frame includes longitudinally extending support members 25 and 26 shown in FIG. 4 and may have end frame members 27 and 28 at the inner and outer ends of the respective lateral duct. Frame members 27 and 28 are shown schematically in FIGS. 4 and 5 and may be suitably joined to members 25 and 26.

Additionally, between each of the individual sheets 23, in each frame assembly there are support beams 30 (which extend at a slant) and have a special shape that slidably receives the longitudinal edges 23A of the respective sheets 23, and supports these edges in a manner which will permit expansion and contraction during use. The members 30 are broken away in FIG. 4, but it is to be remembered that these beams do connect to the frame members 25 and 26 as shown.

Further support for the thin sheets 23 is provided at regular intervals, for example every two feet or so, through the use of light cables or guy wires indicated generally at 31 that are supported at the end frame members 27 and 28 in a suitable clip. The guy wires extend transversely of the sheets 23 along the length of the ducts. These guy wires also are in turn placed in suitable receptacles and wrapped around portions of the lower flanges of the sheet edge support members 30 to aid in supporting the sheets. Note that the collector assembly is tilted at about a 45° angle to provide for a more perpendicular relationship to the sun's rays.

As shown in greater detail in FIG. 6, the end portions of each of the sheets (at ends 23B and 23C) is received in a support clip indicated at 35 and 36, respectively at its opposite ends. The clips for each sheet terminate adjacent to the supports 30. The sheets may be mounted through suitable screws or other fastening devices indicated at 37. The clip 36 is attached to a flat junction member 38 which in turn is attached to a formed angle member 39. Member 38 and channel 39 together comprise the fixed end frame member 26.

At the opposite end of each sheet, that is adjacent to the stringer 15A the frame member 25 is mounted. A reinforcing plate or bar 40 is fixed to one leg of a formed angle iron 41. These members 40 and 41 in turn are fixed to the side members 27 and 28 in a suitable manner and also fixed to stringers 15A. The sheets 23 are not fixedly attached to the members 40 or 41. A plurality of clips 43 are fixed to these members through suitable screws or other fastening devices and the clips in turn each mount one end of a tension coil spring 45, which extends toward the end of the sheet 23 which is indicated at 23B. This spring is hooked into a suitable opening of an outwardly extending flat member 35A forming part of the clip 35. It can be noted that the flat member 35A and the upper bar portion 35B of clip 35 sandwich the thin aluminum sheet 23. A plurality (generally two) of clips 43 and springs 45 are used at the end of each sheet 23.

The springs 45 are under load when the collector sheets are initially installed. The tension from springs 45 is sufficient to keep the sheets 23 relatively planar but without sufficient force to rip the sheets. When the entire collector assembly is made with a plurality of side by side sheets 43, it can be seen that the edges 23A of the sheet 23 that are adjacent the support members 30 (see FIG. 7) are placed into slots indicated at 50 for a first sheet and 51 for a second sheet in these support members, and the sheets are slidably supported in such slots. The frame members 27 and 28 also support the outer edges of the inner and outer edge sheets in each of the assemblies in slots as shown in FIG. 9 so that the sheets can slide relative to their edge support members but yet will receive edge support.

The springs 45 maintain a tension on the sheets 23 and as the sheets expand and contract under thermal variations, the sheets will slide in their respective slots 50 and 51 of the support members 30 between sheets and in the provided slots in the edge frame members so that thermal expansion can be accommodated in two directions, both longitudinally, as taken up by the springs 45, and transversely or laterally, as permitted by the slots 50 and 51, as well as the slots on the frame members 27 and 28. The springs are preferably of size to place about forty pounds tension in the sheets when hot and fifty pounds when cold.

The guy wires or cables 31 extend from the inner end frame member 27 (which may be attached to the side wall of main tunnel 11) to the outer edge frame member 28. At each of the intermediate longitudinal members 30 the wires are wrapped through suitable slots shown generally in FIG. 8. The guy wires pass into a slot 56, and then a section of wire 31A passes to a second slot 57 that is adjacent slot 56, and then they are wrapped back to the slot 56 and extend across the underside of the sheets 23 toward the next frame member 30 where they are wrapped in slots, and finally the wires are terminated and clipped to the frame member 28 in much the same manner as shown in FIG. 9, where the wires are shown connected to frame member 27. The guy wires also tend to keep the members 30 from bending laterally when the wires are wrapped as shown.

The thin flexible solar heat collecting sheets are supported loosely and fastened only at their ends to the perimeter framework, and along their longitudinal edge portion the sheets are supported slidably in slots of the frame members 27, 28 and 30. The midportions are rested on taut guy wires. In this manner, the movement of the sheets from thermal variations is not such that it will cause excessive stresses and ripping of the sheets during use.

It should be noted that these sheets are perforated with a plurality of perforations 23D (see FIGS. 7 and 8) through which air will pass.

The planes of the collector assemblies are positioned at an angle with respect to the horizontal, and the ends of the frames are sealed off with respect to the walls of the lateral ducts at the upper and lower edges of the collector housing. The lateral ducts are thus divided into an upper chamber 63 and a lower chamber 64.

The laterally extending tunnel ducts have a number of air intake conduits shown generally at 60, and these are spaced approximately every eighty feet along the lateral tunnel ducts 12, or at such locations as is desired. The ducts 60 have an intake end 61 (which includes a suitable filter), and an exhaust end 62 which exhausts through a provided opening through the collector housing. Such opening may be formed by offsetting the frame 26 and making one sheet 23 shorter so that such sheet ends adjacent the intake conduit at the upper end. The frame 26 easily can be made to "box" in the intake conduit and provide for shorter sheets at each location of such intake conduits. The conduits 60 discharge fresh air above the solar heat collection assemblies 20 as shown in FIG. 2 and into chamber 63.

An exhaust fan or discharge fan 65 is provided at the end of the main tunnel duct as shown in FIG. 3 to cause air to flow into the intake conduits 60, and which fresh air is discharged into the upper chamber 63 of the laterally extending ducts 12. The pressure differential created by fan 65 is sufficient to insure that air will flow through the apertures 23D of the sheets 23. In a solar collector the radiant energy will heat the sheets 23 and airflow through the apertures will result in heat transfer from the sheets to the air. The air will flow into the lower chamber 64 of the lateral duct 11 and then through the respective openings 24 leading into the main ducts 11. Each of the lateral ducts 12 has a plurality of intake conduits 60 and each lateral duct and its associated solar heat collector are constructed to provide a flow of heated air into the main duct 11.

The heated air is exhausted through the fan 65 and is transferred to a desired location. A large scale, low cost heat collector system can be made as shown so that solar heat collectors having large surface areas can be constructed and housed in a manner that will permit the collector sheets to expand and contract without tearing during high temperature differential or ranges. Further, heated air will flow through a common collector duct. It should be noted that the duct 11 also may be made in a greenhouse type construction, but generally would require a fiberglass roof for the elevated temperatures involved. The roof also can be coated with a solar heat absorbing surface so that it too acts as a collector for additional heat. Insulation may be provided where desired to control heat loss. The ground (floor) and side walls of the central duct generally are insulated to prevent heat loss from the duct. Likewise, the upright wall 16 of the laterally extending ducts can be insulated if desired.

With a standard, available greenhouse construction used for the lateral ducts, the slant length of the collectors will be about 17 feet, and the overall length of the lateral ducts may be up to 1500 feet without having significant problems relating to airflow uniformity.

It should be noted that air leakage around the edges of the sheets where they fit into the slots of the support members, is negligible, but suitable sealing means, such as foamed polyurethane, may be used to seal the edges of the collector to insure that leakage between chambers 63 and 64 is minimized. Flow between the chambers is to occur only through the aperture 23D of the collector sheets. Further, openings 24 lead only from chamber 64 and the interior of the tunnel duct is closed off from the chamber 63 of each lateral duct.

The pressure drop across the sheets 23 is relatively low, on the order of 0.09 inches of water, and thus pressure induced sag is minimized. The perforated sheet used is designed to have a flow rate of about 1.5 cubic feet per minute per square foot of area.

The accommodation of thermal expansion by spring mounting on end as shown is useful with only one elongated strip of material.

What is claimed is:
1. A large scale heat collecting system comprising:
a first duct having an elongated central axis;
a plurality of laterally extending ducts having axes extending generally transverse to said first mentioned duct and having first portions on the interior of said lateral ducts in fluid communication with the interior of said first duct;

a radiant energy collector mounted on each of said lateral ducts, each of said radiant energy collectors comprising;

a frame member having spaced side supports and spaced end supports defining a perimeter, a plurality of elongated strips of perforated sheet material positioned side by side to form a large surface area within the perimeter of said frame member, means on said frame member to support said strips of sheet material comprising means to fasten said strips of sheet material adjacent first ends thereof to one of the end supports of said frame member, and a plurality of resilient members coupled between the other of said end supports of said frame member and the opposite ends of each of said strips of sheet material to maintain tension in said strips of sheet material, and cable means attached to and extending between the side supports of said frame member so that the cable means extend across the lateral width of said strips;

means to cause fluid flow from said laterally extending ducts into said first duct; and air intake means in each laterally extending duct positioned so that fluid flows through said perforated sheet material in its path of movement from said air intake means to said first duct.

2. A large scale heat collecting system comprising:

a first duct having an elongated central axis;

a plurality of laterally extending ducts having axes extending generally transverse to said first mentioned duct and having first portions on the interior of said lateral ducts in fluid communication with the interior of said first duct;

a radiant energy collector mounted on each of said lateral ducts, each of said radiant energy collectors comprising;

a frame member having spaced side supports and spaced end supports forming a perimeter, a plurality of elongated strips of perforated sheet material positioned side by side to form a large surface area within the perimeter of said frame member, means on said frame to support said strips of sheet material comprising means to fasten said strips of sheet material adjacent first ends thereof to one of the end supports of said frame member, and a plurality of resilient members coupled between the other of said end supports of said frame member and the opposite ends of each of said strips of sheet material to maintain tension in said strips of sheet material, and a separate secondary frame member positioned between each adjacent pair of strips of sheet material, said secondary frame members having grooves to slidingly support edge portions of the two adjacent strips of sheet material of each pair of strips to permit said strips to slide longitudinally and transversely relative to the secondary frame members;

means to cause fluid flow from said laterally extending ducts into said first duct; and air intake means in each laterally extending duct positioned so that fluid flows through said perforated sheet material in the path of fluid flow from said air intake means to said first duct.

3. A support mechanism for a collector assembly for collection of radiant energy comprising a frame member, said collector assembly comprising a plurality of thin individual continuous radiant energy collector sheets each having a longitudinal length extending between first and second ends and a transverse width substantially less than the length, and being placed edge to edge to form a large surface to be heated facing generally upwardly, means to fasten said sheets adjacent first ends thereof to said frame member, and means at the opposite end thereof to mount said sheet to said frame member comprising resilient spring members coupled between said frame member and said sheet to maintain a tension in each of said sheets in direction of the longitudinal length of the sheets, said frame member including side supports extending along the lateral edges of said collector assembly, and means to support the sheets between the opposite ends thereof including a plurality of cable means attached to said side supports and extending transversely to the direction of longitudinal length of said sheets across the collector on a side of said sheets opposite from the upwardly facing surface, movement of the sheets transverse to the longitudinal length being substantially unrestrained.

4. The combination as specified in claim 3 and a plurality of secondary frame members positioned between each pair of adjacent sheets along the longitudinal length thereof, said secondary frame members having groove means to slidingly support the edge portions of two adjacent sheets of each pair to permit said sheets to slide longitudinally and transversely relative to said second frame members.

5. The combination of claim 4 wherein said sheets are perforated and said cable means support said sheets under a differential pressure on said sheets.

* * * * *